United States Patent
Böhnke et al.

(10) Patent No.: US 6,728,550 B1
(45) Date of Patent: Apr. 27, 2004

(54) COVERAGE AND CELL EXTENSION IN DOWNLINK POWER CONTROLLED WIRELESS RADIO COMMUNICATION SYSTEMS

(75) Inventors: Ralf Böhnke, Esslingen (DE); Thomas Dölle, Stuttgart (DE); Tino Konschak, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 510 days.

(21) Appl. No.: 09/611,851

(22) Filed: Jul. 7, 2000

(30) Foreign Application Priority Data

Jul. 9, 1999 (EP) .............................................. 99113345

(51) Int. Cl.$^7$ ................................................. H04B 7/00
(52) U.S. Cl. ......................... 455/522; 455/69; 370/321; 370/135; 370/522
(58) Field of Search .................... 455/522, 69; 370/321, 370/337, 522; 375/135

(56) References Cited

U.S. PATENT DOCUMENTS

| | | | |
|---|---|---|---|
| 5,805,646 A | * | 9/1998 | Wang .......................... 375/354 |
| 5,825,758 A | | 10/1998 | Heikkinen et al. |
| 5,917,812 A | * | 6/1999 | Antonio et al. ............... 370/337 |
| 5,933,418 A | * | 8/1999 | Massingill et al. .......... 370/321 |
| 6,366,602 B1 | * | 4/2002 | Raitola ........................ 375/135 |

FOREIGN PATENT DOCUMENTS

| | | |
|---|---|---|
| WO | WO 98 21912 | 5/1998 |
| WO | WO 98 28859 | 7/1998 |

* cited by examiner

Primary Examiner—Nay Maung
Assistant Examiner—Alan T. Gantt
(74) Attorney, Agent, or Firm—Frommer Lawrence & Haug LLP; William S. Frommer; Dennis M. Smid (57) ABSTRACT

The present invention relates to a base station (1, 10, 20) and a mobile terminal (40, 50, 60) as well as a communication method for communicating in a wireless radio communication system. Thereby, the information is transmitted and received in medium access control frames of the communication system, whereby the transmission power of at least a broadcast control channel and a frame control channel in a respective medium access control frame transmitted by a base station is increased after certain time intervals to an increased transmission power level as compared to the transmission power level of other medium access control frames transmitted during said time intervals. The transmission of at least a broadcast control channel and a frame control channel with significantly increased power levels from time to time allows new mobile terminals trying to gain access to a base station to connect with this base station even if the effectively used transmission power is reduced on the basis of the transmission conditions of already connected mobile terminals.

29 Claims, 7 Drawing Sheets

COVERAGE AND CELL EXTENSION IN DOWNLINK POWER CONTROLLED WIRELESS RADIO COMMUNICATION SYSTEMS

The present invention relates to a base station for communicating with one or more mobile terminals of a wireless radio communication system, to a mobile terminal for communicating with a base station of a wireless radio communication system and a communication method for the communication between a base station and one or more mobile terminals of a wireless radio communication system. Particularly, the present invention relates to the power control of downlink information transmitted from a base station to one or more mobile stations in a short range wireless local area network.

In certain wireless local area communication systems as the proposed ETSI BRAN Hiperlan 2 system proposed for a short range wireless communication, as for example having a transmission range of 50 m to 100 m, a downlink slow or semistatic power control is used for the transmission of downlink information in order to reduce interference to neighbouring cells and systems. In the paper HL 13.5 ERI 2 a of May 12, 1999 for the planned ETSI BRAN standard, several proposals are disclosed for such a slow or a semistatic power control. In a wireless local area communication systems, as the proposed ETSI BRAN Hiperlan 2 system, user and control data are transmitted in so-called medium access control (MAC) frames. A MAC frame is a basic transmission frame and contains for example a broadcast control channel (BCCH), a frame control channel (FCCH), downlink data, uplink data and a random access channel (RACH). It is to be noted that the above specified communication system is a time division duplex (TDD) system, in which uplink and downlink transmission of user data is possible within one MAC frame. However, the present invention also relates to wireless radio communication systems in which the basic transmission frames or MAC frames only comprise either downlink or uplink data, as e. g. in a FDD system. Downlink transmission is the transmission of user or control data between a base station, also called access point or central control station, and one or more mobile terminals of the wireless communication system. Mobile terminals in the present context are all devices being dependent on or being controlled by a base station, e. g. in a Master-Slave relationship. The word "mobile" has been chosen to indicate that this kind of device may be freely moved within the transmission range of a respective base station. Uplink transmission is the transmission of user and control data from a mobile terminal to the corresponding base station. The communication system is a wireless radio communication system, in which signals are transmitted in the radio range, as for example the GHz range.

In the above-mentioned ETSI BRAN paper, several possibilities of a power control for the downlink transmission are described in order to avoid interference with other cells of the communication system or with other communication systems. One possibility is to assign downlink transmitter power independently to each mobile terminal communicating with the respective base station. This requires a complex design of the base station, since the transmitter power has to be changed several times during the downlink phase of one MAC frame duration. Additionally, the mobile terminals have to measure the received transmission power and communicate corresponding information to the base station. Since it is proposed to use the same downlink transmission power for all mobile terminals, the transmission power should be chosen so that all mobile terminals in one cell have sufficient reception.

In this case, one possible solution is to transmit the BCCH and the FCCH with a fixed power and to apply power control only to the rest of the downlink data transmitted in one MAC frame. Thereby, provisions have to be made in the base station in order to change the transmission power within one MAC frame and the automatic gain control in the receiving mobile terminals must be quite complex, since it has to be able to cope with the fast changes in the received transmission power between the BCCH/FCCH and the user data within a MAC frame. This proposal therefore leads to a high circuit complexity and a high power consumption on both sides, i.e. the base station and the mobile terminals, particularly since in all MAC frames the BCCH/FCCH and the user data are transmitted with different transmission powers.

A second proposed possibility is to use the same downlink transmission power in the entire MAC frames, i.e. power control is applied to the BCCH/FCCH as well as the downlink user data. Thereby, the mobile terminals within one cell communicating with a base station have to measure the received downlink transmission power and send corresponding information to the base station. On the basis of the received information the base station sets the downlink power control so that the mobile terminal having the worst reception still receives the downlink information with a sufficient quality. This possibility, however, has the disadvantage that the effective cell size is reduced to the actual active (communicating) mobile terminals. Since the effective cell size is limited, new mobile terminals can only gain access to the base station if they are within this limited coverage range.

The object of the present invention is therefore to provide a base station, a mobile terminal and a communication method of a wireless radio communication system of the above-mentioned type, which support a transmission power control of downlink information without limiting the transmission range only to currently active mobile terminals.

This object is achieved by a base station for communicating with one or more mobile terminals of a wireless radio communication system according to claim 1, with transmitting means for transmitting information in medium access control frames of said communication system, power control means for controlling the transmission power of the transmitting means so that the transmission power of at least a broadcast control channel and a frame control channel in a respective medium access control frame is increased after certain time intervals to an increased transmission power level as compared to the transmission power level of other medium access control frames (namely the downlink sections thereof) transmitted during the time intervals.

The above object is further achieved by a mobile terminal for communicating with a base station of a wireless radio communication system according to claim 12, with receiving means for receiving information in medium access control frames of said communication system, processing means for processing received information, adjusting means for adjusting the processing means to the transmission power of the received information, whereby the transmission power of at least a broadcast control channel and a frame control channel in a respective medium access control frame is increased after certain time intervals to an increased transmission power level as compared to the transmission power level of other medium access control frames (namely the downlink sections thereof) transmitted during said time intervals.

The above object is further achieved by a communication method for the communication between a base station and one or more mobile terminals of a wireless radio communication system according to claim 22, whereby information is transmitted and received in medium access control frames of the communication system, and whereby the transmission power of at least a broadcast control channel and a frame control channel in a respective medium access control frame is increased after certain time intervals to an increased transmission power level as compared to the transmission power level of other medium access control frames (namely the downlink sections thereof) transmitted during the time intervals.

It is to be noted that a medium access frame of the wireless radio communication system in the context of the present invention is a basic transmission frame comprising control and user data exchanged between a base station and a mobile terminal of the wireless radio communication system. Thereby, the increased power level transmission according to the present invention only concerns the transmission of downlink information, i. e. the transmission from a base station to one or more mobile terminals. Thus, a medium access control frame may either contain only downlink data, as e. g. in a FDD system, or contain downlink as well as uplink data, as e. g. in a TDD system. The present invention, however, only concerns the downlink data thereof.

According to the present invention, at least the BCCH and the FCCH of certain MAC frames (not all MAC frames) are transmitted with an increased power level so that new mobile terminals which are not covered with the actual effective cell size because of the normally performed slow or semistatic downlink transmission control are able to gain access to the base station by detecting the BCCH/FCCH transmitted with increased transmission power level. Thereby, either the BCCH and the FCCH of one MAC frame, one entire MAC frame (i.e. its downlink section including the BCCH, the FCCH and the downlink user data) or a couple of succeeding MAC frames (i.e. their downlink sections) can be transmitted with the increased transmission power level. The normal MAC frames transmitted during the certain time intervals between the increased power transmission are transmitted under a normal slow or a semistatic power control, so that the effective cell size is limited during these certain time intervals to the actually active mobile terminals. However, the transmission with the significantly increased transmission power level as compared to the normal transmission power level during the certain time intervals allows to connect new mobile terminals to gain access to the base station by listening to the BCCH/FCCH of the respective base station during a time period longer than the respective certain time interval. Thus, even mobile terminals outside the current effective coverage range of the base station can receive the essential BCCH/FCCH information and gain access to the base station even if the base station uses slow or semistatic downlink transmission power control. On the other hand, since the downlink transmission power control is performed during most of the time, interference to other cells and other systems is still avoided to a very large extent. Further, simple processing implementation is possible in the base station as well as in the mobile terminals.

Advantageously, the increased transmission power level of the base station according to the present invention is an absolut transmission power level e. g. a preset maximum power level of the communication system. Thereby, the increased transmission power level is always the same irrespective of the currently set transmission power level of the normal MAC frames transmitted during the certain time intervals.

Alternatively, the increased transmission power level is set relative to the power level of the normal medium access control frames transmitted during said certain time intervals. In this case, for example a certain transmission power level amount could be added to the currently set power level of the normal MAC frames.

In both cases, the increased power level (absolut or relative) may be varied in the base station according to system requirements. Thereby, this information has to be signalled to the connected mobile terminals.

Further advantageously, the certain time intervals are regular time intervals set by the power control means of the base station according to the present invention so that the transmission means transmits at least a broadcast control channel and a frame control channel of a respective medium access control frame regularly with said increased transmission power level after a fixed number of medium access control frames transmitted with a lower transmission power. The regular transmission of at least the BCCH and the FCCH of a MAC frame has the advantage that only simple processing is necessary. Particularly, mobile terminals trying to gain access to the base station only have to listen during a fixed time period being slightly longer than the regular time interval between two increased power transmissions to assure a guaranteed reception of the BCCH and FCCH. In this case, a mobile terminal only has to have knowledge about the length of the time intervals between the transmission with increased transmission power, i.e. the repetition rate.

Advantageously, the power control means of the base station sets the regular time intervals on the basis of a current medium access control frame number and a pre-set repetition rate. In this case, the mobile terminals which are already connected to the base station are able to synchronise in a simple and easy way to the transmission with the increased power level, which is important since the receiving processing of the mobile terminals has to be adapted to the received transmission power in order to enable a correct processing. Thereby, the transmitting means of the base station may transmit the repetition rate to the mobile terminals. The mobile terminals are then able to adapt their receiving processing to the reception of increased power levels by implementing the same scheduling algorithm as the base station.

Instead of transmitting the repetition rate to the mobile terminals a fixed repetition rate could be stored in the base station and the mobile stations, respectively. In another alternative, the base station may comprise means for providing information on the transmission time and/or the power level of a respective medium access control frame in which at least a BCCH and a FCCH are transmitted with said increased transmission power level, whereby the transmitting means of the base station transmits the information to one or more mobile terminals before the transmission of at least the BCCH and the FCCH with the increased transmission power level. By announcing the transmission with the increased transmission power level shortly before the actual transmission with the increased transmission power level the mobile terminals do not need to have any scheduling algorithm in order to be able to adopt to the reception of the increased transmission power levels, but may wait for the information from the base station announcing the power change and adopt the receiving processing correspondingly.

Alternatively to the transmission with the increased power level at regular intervals, the certain time intervals may be random time intervals set by the power control means of the base station so that the transmission means of the base station transmits at least a BCCH and a FCCH of a respective MAC frame after a randomly set number of MAC frames transmitted with the normal (lower) transmission power. The random time intervals allow a further decrease of the interference risk.

In this case, the base station according to the present invention advantageously comprises a random number generating means for generating a random number for each MAC frame to be transmitted, whereby the power control means sets the random time intervals on the basis of the random numbers, a respective current medium access control frame number and a repetition rate. Thereby, the random number generating means can for example be a linear feedback shift register providing pseudo random numbers. The use of random numbers, respective current medium access control frame numbers and a repetition rate enables the implementation of a simple and efficient scheduling algorithm, which may also be used in the mobile terminals to be able to adopt to the changing power levels. In this case, the base station of the present invention may transmit the repetition rate to the mobile terminals so that the repetition rate may be varied from time to time depending on system requirements. Alternatively, the repetition rate may be fixed and stored in both the base stations and the mobile terminals.

In order to avoid the necessity of implementing any scheduling algorithm in the mobile terminals, the base station may comprise means for providing information on the transmission time and/or the power level of a respective MAC frame in which at least a BCCH and a FCCH are transmitted with the increased transmission power level, whereby the transmitting means transmit the information to one or more mobile terminals of the communication system respectively before the transmission with the increased transmission power level.

As stated above, the adjusting means of the mobile terminal according to the present invention serves for adjusting the processing means of the mobile terminal to the transmission power of the received information, which is important since the significant change of the transmission power level according to the present invention may lead to problems in the receiving processing in the mobile terminal. Thus, the adjusting means of the mobile terminal has to be able to adjust the processing means in correspondence to the schedule of the transmission with an increased transmission power level by the base station of the present invention.

Advantageously, the adjusting means of the mobile terminal of the present invention is adapted to adjust the processing means to an increased transmission power level being an absolut transmission power level, e. g. a preset maximum power level of the communication system. In this case, the base station always uses the same transmission power level for the transmission of at least the BCCH and the FCCH of a MAC frame with the increased transmission power level. Hereby, no further processing is necessary to adopt the system to a varying enhanced power level. Alternatively, the adjusting means of the mobile terminal of the present invention may be adapted to adjust the processing means to an increased transmission power level being increased by a relative value in respect to the power level of MAC frames transmitted during the certain time intervals, i.e. transmitted with normal transmission power. Hereby, the increased transmission power level can be adopted to the power level of the normal MAC frames being power controlled in a normal way. In both cases, the absolutely or the relatively increased power level can be preset or can be signalled from the base station to the mobile terminal. The mobile terminal receiving the respective information then adapts its processing accordingly.

In case that the certain time intervals are regular time intervals, as explained above in relation to the base station, the adjusting means of the mobile terminal of the present invention regularly adjust the processing means to the increased transmission power level of at least the BCCH and the FCCH of a respective MAC frame after a fixed number of MAC frames transmitted with the normal (lower) transmission power. Hereby, no complicated processing implementation is necessary in a mobile terminal, since the mobile terminal only requires knowledge about the repetition rate or a fixed number of MAC frames transmitted with the normal transmission power as well as the time point of the transmission with the increased power level. Therefore, the mobile terminal advantageously comprises means for setting the regular time intervals on the basis of a current medium access control frame number and a repetition rate. These two pieces of information allow a simple and effective implementation of a scheduling algorithm so that the mobile terminal can adopt its receiving processing to the transmission level changes so that a proper processing of the received information is assured. Thereby, the repetition rate may by fixed and stored in a mobile terminal as well as in the base station, or the repetition rate is transmitted from the base station and received from the mobile terminal, so that the repetition rate may be varied from time to time depending on system requirements.

In case that the base station transmits at least a BCCH and FCCH with increased power level in random time intervals, the adjusting means of the mobile terminal according to the present invention adjusts said processing means to the increased transmission power level of at least the BCCH and the FCCH of a respective MAC frame after a randomly set number of MAC frames transmitted with the normal (lower) transmission power. Thereby, the mobile terminal may comprise setting means for setting the random time intervals on the basis of the random numbers, a respective current medium access control frame number and a repetition rate. In this way, the scheduling algorithm in the mobile terminal can be adopted in a simple and effective way to the scheduling algorithm of the base station so that a correct adjustment of the receiving processing to the changing power levels is assured. The mobile terminal thereby uses a random number and a current MAC frame number both received from the base station as well as a repetition rate for the scheduling algorithm. The repetition rate may either be received from the base station, so that it can be varied from time to time, or the repetition rate may be fixed and stored in the mobile terminal as well as in the base station.

In both above-mentioned cases, i.e. the regular and the random transmission of at least a BCCH and a FCCH with increased transmission power the implementation of a scheduling algorithm in a mobile terminal can be completely avoided when the base terminal transmits corresponding announcement information shortly before the transmission of at least a BCCH and a FCCH with the increased power level. In this case, the mobile terminal according to the present invention advantageously comprises detecting means for detecting said information on the transmission time and/or the power level of a respective MAC frame in which at least the BCCH and the FCCH are transmitted with the increased transmission power level respectively before the transmission of at least the BCCH and the FCCH with the increased transmission power level and for supplying the information to the adjusting means.

The present invention is explained in the following description in more detail by means of preferred embodiments thereof relating to the enclosed drawings, in which.

In FIGS. 1 to 6, different possibilities of transmitting at least a BCCH and a FCCH in one or more succeeding MAC frames repetitively after certain time intervals is shown in transmission power versus time diagrams.

The shown transmission power schemes are examples of a chain of MAC frames, i.e. medium access control frames, transmitted from an access point or a base station to one or more mobile terminals on the basis of a wireless radio communication system in a respective cell. Thereby, the present invention particularly relates to the wireless transmission in local area networks, i.e. systems having a short range of for example 50 m to 100 m, and transmit user and control information in MAC frames having for example a time duration of about 2 ms.

In the examples shown in FIGS. 1 to 6, one MAC frame comprises a downlink section and an uplink section, whereby the downlink section may comprise the BCCH, the FCCH and the downlink data and the uplink section may comprise the uplink data and the RACH. The BCCH (broadcast control channel) and the FCCH (frame control channel), inform new users, i.e. mobile terminals on procedures to access the system, via a respective base station in a cell. The FCCH for example gives information when and how to perform an initial random access on the RACH (random access channel). It has to be noted that a MAC frame according to the present invention may also comprise only downlink traffic. The transmission with increased power levels after certain time intervals according to the present invention only concerns the transmission of downlink data with increased power level as compared to the downlink data transmitted during said certain time intervals.

In FIGS. 1 to 6, a long chain of succeeding MAC frames having the same low transmission power is shown. These MAC frames transmitted with the normal and low transmission power are power controlled for example by a slow or semistatic power control on the basis of measured transmission powers from the mobile terminals. The respective information from the mobile terminals is used in a corresponding base station to power control the transmission power of the normally transmitted MAC frames, namely the downlink sections thereof, so that the lowest possible transmission power is used which still enables a good connection to the currently active mobile terminal having the worst transmission conditions.

In order to enable new mobile terminals to gain access to the base station, too, the base station transmits at least a BCCH and a FCCH of one or more succeeding MAC frames, i. e. the downlink sections thereof, with increased transmission power after certain time intervals. The certain time intervals can be regular time intervals, which means that the mobile station regularly transmits at least the BCCH and the FCCH of one or more MAC frames with increased transmission power, or the certain time intervals can be randomly chosen, in which case the base station transmits at least the BCCH and the FCCH of one or more MAC frames irregularly with increased transmission power. The level of the increased transmission power can either be an absolut transmission power level or can be set repetitively relative to the normal power level of the MAC frames transmitted during the certain time intervals. In the first case, at least the BCCH and the FCCH of one or more MAC frames is transmitted with significantly increased transmission power having a fixed value. In the second case, the increased transmission power level may be calculated each time by adding a pre-set power level step to the power level of the MAC frames transmitted with a normal slowly controlled transmission power. In both cases, the base station may vary the absolute or the relative value depending on system requirements and signal the changed value to the mobile terminals.

Figure 1:
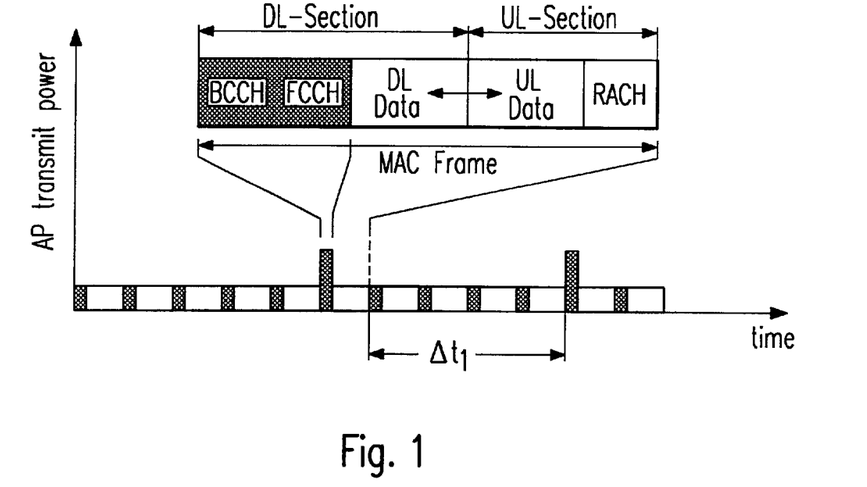
FIG. 1 shows a first example of transmitting the BCCH and FCCH in a MAC frame with increased power level.

FIG. 1 shows a first example of a transmission scheme according to the present invention, in which a base station transmits only the BCCH and FCCH of a single MAC frame with increased transmission power. After transmitting the BCCH and the FCCH with increased transmission power, the downlink data of the same MAC frame are transmitted with the normal power level as set by the slow or semistatic power control scheme. After a time interval $\Delta t_1$ having a length of 4 MAC frames, the BCCH and FCCH of the fifth MAC frame is transmitted with increased transmission power again.

Figure 2:
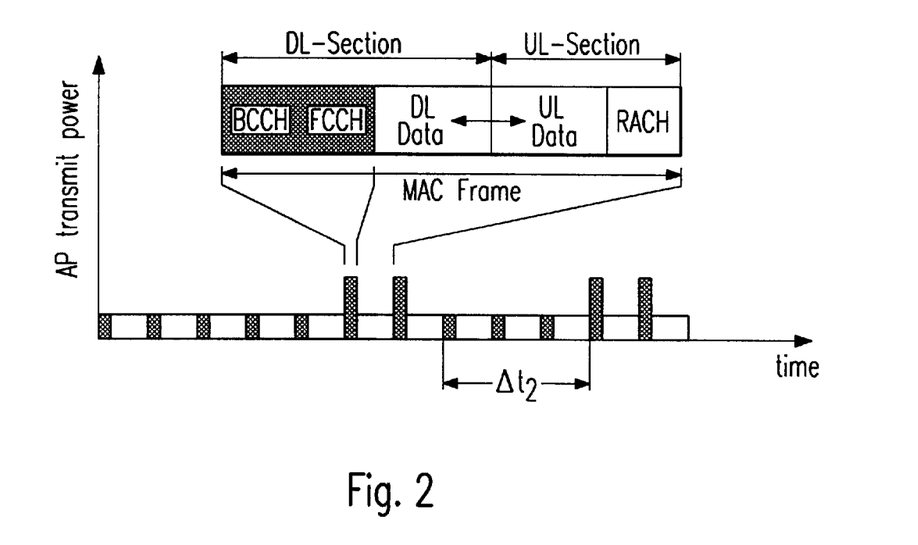
FIG. 2 shows a second example of transmitting the BCCH and FCCH of two consecutive MAC frames with increased power level.

In FIG. 2, a second example of a transmission scheme according to the present invention is shown. In this second example, the base station transmits the BCCH and the FCCH of two succeeding MAC frames with increased transmission power. The downlink data of these two MAC frames are transmitted with the normal transmission power as the other MAC frames transmitted during the time interval, in which transmission with normal power level is performed. After the time interval $\Delta t_2$ having a length of 3 MAC frames, the BCCH and FCCH of the fourth and the fifth MAC frame are transmitted again with the increased transmission power level. The transmission with increased transmission power within two succeeding MAC frames has the advantage of a higher probability of reaching new mobile terminals entering the respective cell while still significantly reducing the interference risk. It is to be noted, that the time intervals give an example in FIG. 1 and FIG. 2 of four MAC frames and three MAC frames, respectively, may be chosen to be longer in practical application, for example 128 to 256 MAC frames or more depending on the transmission conditions in the respective cell.

Figure 3:
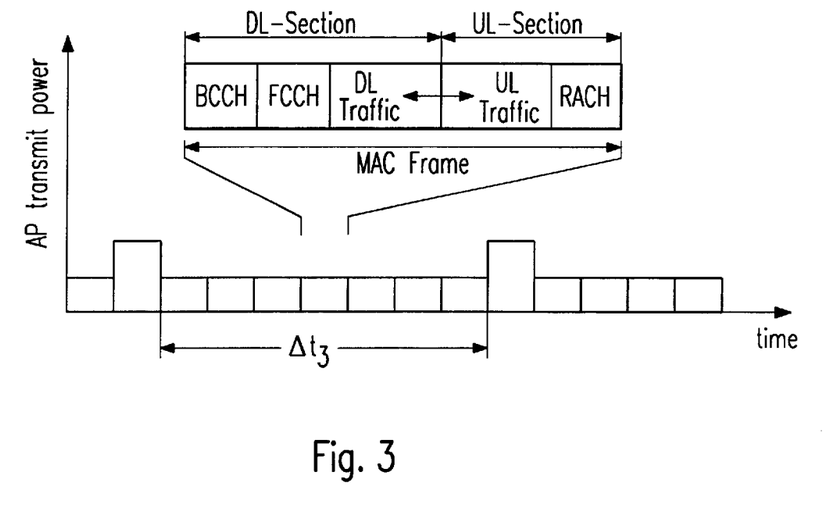
FIG. 3 shows a third example of transmitting the entire downlink section of a MAC frame with increased power level.

FIG. 3 shows a third example of a transmission scheme according to the present invention in which the entire downlink section of a single MAC frame is transmitted with increased transmission power. The advantage here as compared to the scheme shown in FIGS. 1 and 2 is that the transmission power in a base station does not have to be changed within the downlink section of the MAC frame, since the BCCH, the FCCH and the entire downlink traffic is transmitted with the increased transmission power. The uplink section, i.e. the information transmitted from the mobile terminal to the base station within the same MAC frame does not necessarily have to have the same increased transmission power, but may be power controlled differently depending on the used uplink power control scheme. After the time interval $\Delta t_3$ having the length of 7 MAC frames, the downlink section of the 8th MAC frame is again transmitted with increased transmission power as compared to the 7 MAC frames transmitted during the time interval $\Delta t_3$.

Figure 4:
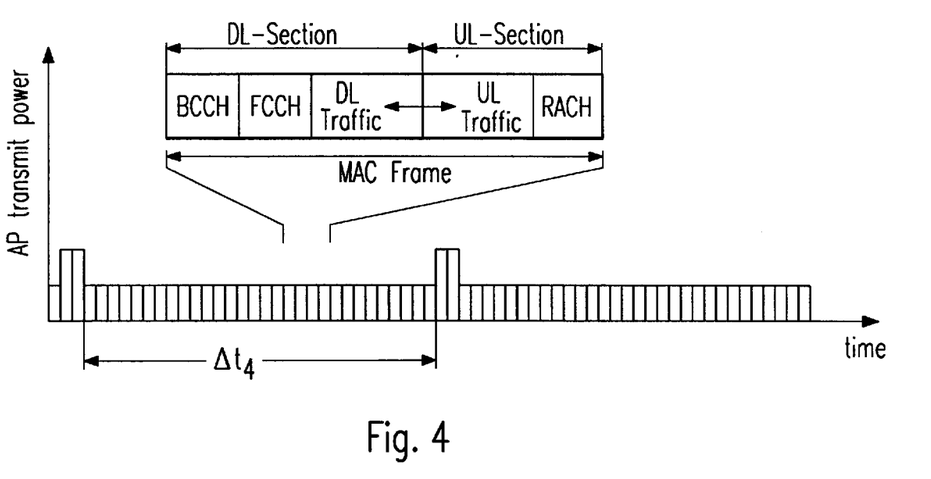
FIG. 4 shows a fourth example of transmitting the downlink section of two consecutive MAC frames with increase power level.

In FIG. 4, a fourth example of a transmission scheme according to the present invention is shown, in which the entire downlink section of two consecutive MAC frames is transmitted with increased transmission power. It has to be noted that the uplink sections of these two consecutive MAC frames do not necessarily have to have the same increased transmission power, but are transmitted with a transmission power set in correspondence to the respectively used uplink power control scheme. The same is true for all other examples shown and covered by the present invention. After a time interval $\Delta t_4$ having the length of 32 MAC frames, the next two MAC frames, namely their downlink sections, are transmitted with increased transmission power again. The MAC frames transmitted during the time interval $\Delta t_4$ are transmitted with a transmission power set according to the normal slow or semistatic power control scheme used.

Figure 5:
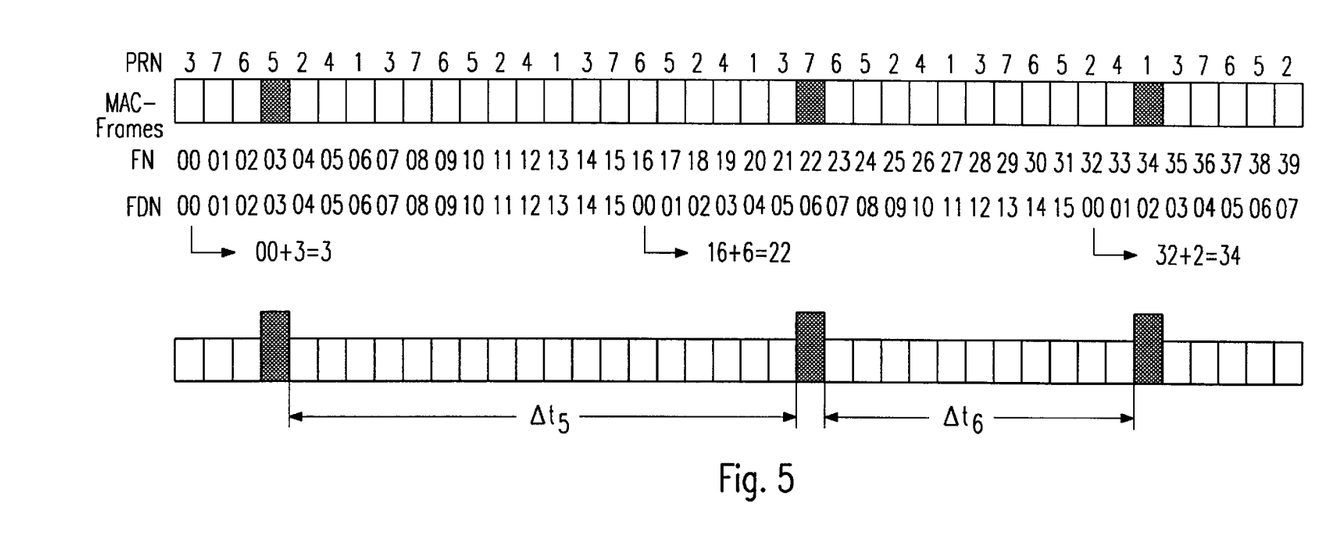
FIG. 5 shows an example for the calculation of unregular time intervals between the transmission of single MAC frames with increased power level.

As already stated above, the time intervals between the transmission with increased power levels can be either regular or randomly set. In the examples shown in FIGS. 1 to 4, the time intervals $\Delta t_1$, $\Delta t_2$, $\Delta t_3$ and $\Delta t_4$ may be regularly used as the time intervals after which a transmission with increased power level is performed. On the other hand, the length of these time intervals may be set randomly according to a scheduling algorithm implemented in the base station. This scheduling algorithm may for example use a pseudo random number generator for setting the respective time intervals or for choosing the time points for the transmission with increased power levels. In FIG. 5, an example for such a scheme is shown, in which the downlink section of a single MAC frame is transmitted with increased transmission power in irregular or randomly set time intervals. The first time interval $\Delta t_5$ has a length of 18 MAC frames, whereby the second interval $\Delta t_6$ has a length of 1 MAC frames. The calculation of the length of these regular time intervals is performed on the basis of a pseudo random number PRN, the current MAC frame number FN and a repetition rate N as the basic repetition rate for the MAC frame power increase. The current MAC frame number FN and the basic repetition rate N are used to calculate a frame divider number FDN, which describes the basic allocation of a MAC frame with an increased transmission power. The calculation scheme used in the example shown in FIG. 5 is:

(FN % N)=FDN in other words FN(mod)N=FDN

In the example shown in FIG. 5 the basic repetition rate N equals 16. Each time FDN equals zero (FN % N=0) then the current pseudo random number PRN is read and added to the current MAC frame number FN to obtain the MAC frame number to be transmitted with the increased power level. For the generation of the random number PRN, for example a linear feedback shift register can be used which generates a pseudo random chain of numbers.

In the above-explained FIGS. 1 to 5 a transmission of at least a BCCH and a FCCH of one or more MAC frames with increased transmission power level in order to enable new mobile terminals being located outside of an effective cell size determined by already connected mobile terminals has been explained. The already connected mobile terminals being somehow connected to the base station communicate with the base station on the basis of a normal slow or a semistatic power control scheme which usually determines the used transmission power on the basis of the transmission condition between the base station and the mobile terminal having the worst connection. A new mobile terminal being further away or having even worse access conditions connection will not be able to gain access to the base station due to the too low transmission power of the BCCH and the FCCH and thus has to listen to the base station until the base station transmits at least the BCCH and the FCCH with an increased power level as explained above.

However, the mobile terminal already connected to the base station have to adjust their receiving processing to the received transmission power of the MAC frames. Under normal the slow or semistatic power control scheme allows the mobile terminals to automatically adjust their receiving processing to the very slowly changing transmission power. Since at least a BCCH and a FCCH of one or more MAC frames is transmitted with a significantly increased transmission power level after certain time intervals according to the present invention, the already connected mobile terminals have to be able to cope with this significantly increased transmission power. Under normal conditions, the receiving processing in the mobile terminals would fail if a suddenly increased power level would be received and the corresponding information could not be processed and used.

Therefore, the already connected mobile terminals have to have knowledge about the time points at which a transmission with an increased power level according to the present invention occurs. One possibility is that the same scheduling algorithm for determining the length of the time intervals or the time points of the transmission with increased power level has to be used in the base station and the mobile terminals so that the mobile terminals always know exactly when a transmission with an increased power level is to be expected. Thereby, the scheduling algorithms in the base station and the mobile terminals have to be synchronised, for example by synchronised timers or the like.

Figure 6:
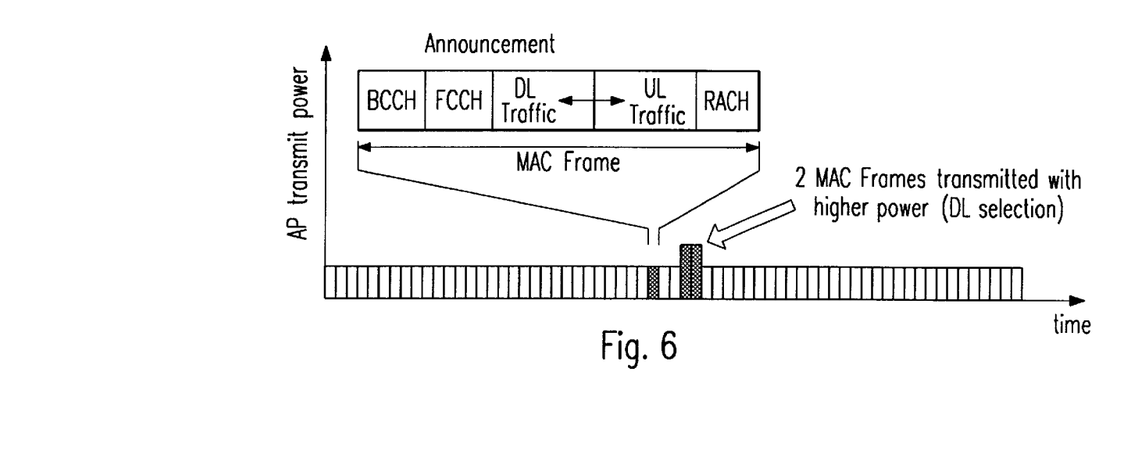
FIG. 6 shows a schematic example of transmitting announcement information to MAC frames before the transmission of two consecutive MAC frames with increased power level.

A further possibility explained in relation to FIG. 6 is that the base station transmits announcement information to the mobile terminals shortly, for example some MAC frames, before the transmission of at least the BCCH and the FCCH in a MAC frame with the increased power level in order to inform the mobile terminals that and when a reception of increased power levels is to be expected. With this scheme the base station has the full control of the scheduling of the transmission with increased power levels and the mobile terminals do not need the scheduling means and synchronisation means for the scheduling means. Thereby, a better scheduling flexibility is achieved so that the transmission of increased power levels from the base station can be adapted to different system requirements and the complexity and the processing in the mobile terminals is significantly reduced.

In the example shown in FIG. 6, the base station transmits an announcement information, for example in the BCCH or the FCCH or any other essential communication control channel of a MAC frame to MAC frames before the transmission with the increased power level to the mobile terminals. Thereby, the announcement information may contain information on the start position, time point and/or the power level of the MAC frame with an increased power level relative to the MAC frame containing the announcement information. For example, the announcement information may announce that the start position is the next MAC frames or two MAC frames later or the like. Further, the announcement information may contain the number of consecutive MAC frames transmitted with an increased power level, for example a single MAC frame, two MAC frames or the like. Also, the announcement information may contain information indicating if only the BCCH and the FCCH of the one or more MAC frames is transmitted with the increased power level or the entire downlink section of the respective MAC frames is increased with the increased power level. Also, the announcement information may contain information on the power level of the MAC frames transmitted with the increased power level, as for example the absolute power level value or a relative power of said value in respect to the MAC frame containing the announcement information. As stated above, the power level of the MAC frames transmitted with the increased power level may for example be an absolute value, for example +21 dBm or a relative value, for example 6 db relative to the normal power level used for the normally transmitted MAC frames.

The announcement information is advantageously contained as a message in the essential communication control channels, for example the BCCH, the FCCH or an extended BCCH, as for example a slow BCCH which is only transmitted if necessary. Usually these essential communication control channels are transmitted using the most robust transmission schemes and therefore ensure a reliable and secure information exchange which is important to enable the mobile terminals to cope with the increased transmission power levels. The message format of the announcement information may contain a message identifier to identify the announcement information, the relative or absolute start position of the MAC frames transmitted with increased power contained in e.g. 2 bits, the number of the consecutive MAC frames transmitted with increased power contained in e.g. 2 bits, the relative or absolute power level of the MAC frames transmitted with the increased power, and/or information, e. g. 1 bit, indicating if only the BCCH and the FCCH or the entire downlink section of the MAC frame is power increased.

Figure 7:
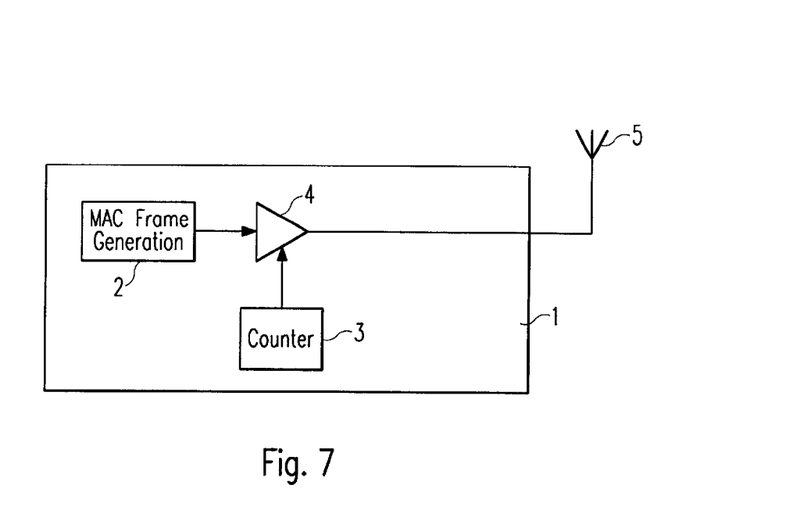
FIG. 7 shows a first embodiment of a base station according to the present invention.

FIG. 7 shows a block diagram of a first embodiment of a base station 1 according to the present invention. The base station 1 is a very simple but effective example of transmitting at least the BCCH and FCCH of one or more MAC frames with an increased power level in regular intervals. The base station 1 comprises a MAC frame generation means 2, a counter 3, a power amplifier 4 and an antenna 5. The power amplifier 4 is for example part of a HF upconverting means. The counter 3 counts every MAC frame generated in the MAC frame generation means 2 and amplified in the amplifier 4. Every time the counter 3 signals a counter event, as for example every 8 th MAC frame, it indicates to the amplifier 4 to use an increased power level for the respective MAC frame. All other MAC frames are amplified and transmitted with the normal (lower) transmission power determined by the normal slow and semistatic power control mechanism. The increased transmission power level used in the amplifier 4 is either an absolut power level, e. g. a pre-set maximum power level or the amplifier 4 adds a pre-set power level amount to the currently used power level. A mobile terminal communicating with the base station 1 either knows the repetition rate used in the counter 3 of the base station 1 for the regular increase of the power level and thus only needs to synchronise with the base station 1 in order to be able to adjust its receiving processing to the increased power levels. Otherwise, the base station 1 transmits a repetition rate information used in the counter 3 to the mobile terminal so that the mobile terminal knows the respectively used repetition rate for the transmission of increased power levels and is able to adjust its receiving processing to this repetition rate after a corresponding synchronisation. Another possibility is that the base station 1 transmits announcement information as explained in relation to FIG. 6 shortly before the transmission of an increased power level to the mobile terminal. In this case, the mobile terminal does not need knowledge about the repetition rate, but is able to adjust its receiving processing on the basis of the received announcement information. An example for such a mobile terminal is shown and explained in relation to FIG. 13.

Figure 8:
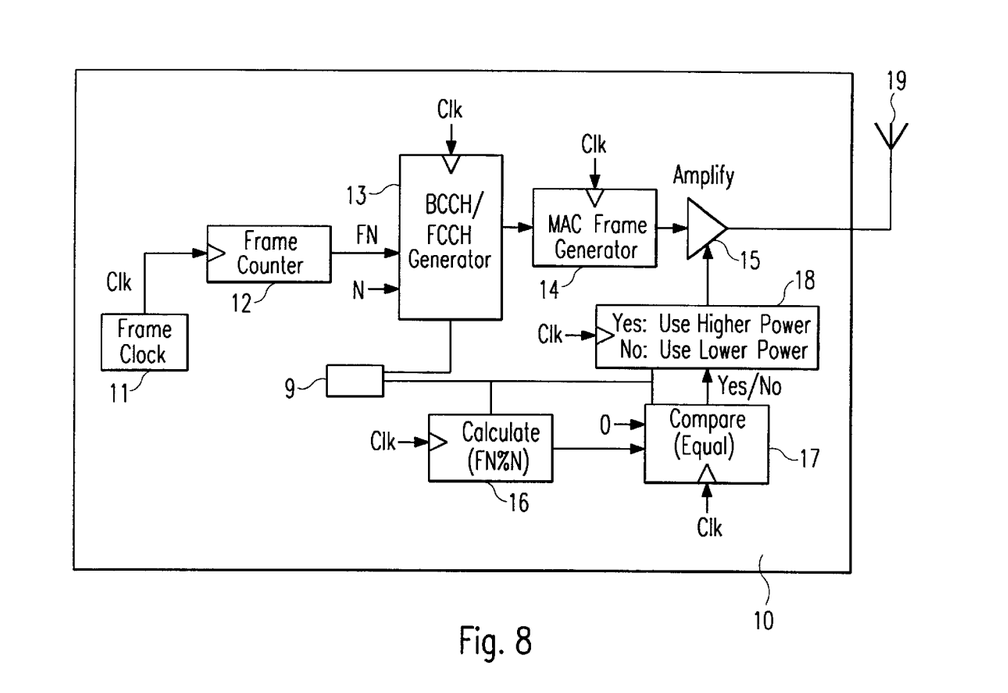
FIG. 8 shows a second embodiment of a base station according to the present invention.

FIG. 8 shows a block diagram of a second embodiment of a base station 10 according to the present invention. The base station 10 is adopted to transmit at least the BCCH and the FCCH of one or more MAC frames with increased power level in regular time intervals. Thereby, the regular time intervals or the regular time points at which the transmission with the increased power level is performed is calculated on the basis of the respective current MAC frame number FN and a repetition rate N.

The base station 10 comprises a frame clock 111 for generating a clock signal and a frame counter 12 for generating consecutive numbers for the generated and transmitted MAC frames. Further, the base station 10 comprises a generating means 13 for generating the BCCH and the FCCH for each transmitted MAC frame and a MAC frame generator 14 to which the BCCH and the FCCH generated in the generating means 13 are supplied. The MAC frame generator 14 is supplying the generated MAC frames to an amplifier 15, which is for example part of a HF upconverting means, and transmits the amplified MAC frames over the antenna 19 to one or more mobile terminals of the wireless communication system.

Further, the base station 10 comprises power control means with a calculating means 16, comparing means 17 and a power setting means 18. The calculating means 16 is supplied with the current MAC frame number from the frame counter 12 and the repetition rate N and performs the calculation FN % N, in other words FN(mod)N. The result of this calculation is supplied to the comparing means 17, which compares this result to the number zero. The comparing means 17 outputs a yes signal to the power setting means 18 in case that the calculation result from the calculation means 16 is zero, i.e. when the current MAC frame number can be properly divided by the repetition rate N. Otherwise, the comparing means 17 outputs a no signal to the setting means 18. Every time the power setting means 18 receives the yes signal from the comparing means 17, it outputs a high power information to the amplifier means 15 indicating that a higher power level should be used for the current MAC frame (or at least the BCCH and the FCCH of this frame). Otherwise, the power setting means 18 outputs the low power information to the amplifier 15 indicating that the normal (lower) power as set by the respective slow or semistatic power control mechanism should be used for the respective MAC frame. The high power level can either be an absolut power level, e. g. a pre-set maximum power level of the system or can be a power level set relatively on the basis of the currently used power level for the normal MAC frames, for example by adding a pre-set power level step thereto.

A mobile terminal communicating with the base station 10 has to be able to adjust its receiving processing to the regularly transmitted increased power levels. Therefore, the mobile terminal should use the same scheduling algorithm as the power control means 16 to 18 and particularly the same calculation FN % N=0 to be able to determine when an increased power level is to be expected. In this case, a synchronisation of the two scheduling mechanisms is also required. An example for such a mobile terminal is shown and explained in relation to FIG. 11.

On the other hand, the base station 10 can further comprise an announcement information means 9 for providing announcement information to be transmitted to the mobile terminal to announce the transmission of an increased power level shortly before the actual transmission with an increased power level, as for example explained in relation to FIG. 6. The announcement information means 9 is connected to the generating means 13 so that the announcement information can be implemented in the BCCH or FCCH of a MAC frame transmitted shortly before the transmission of the MAC frame with an increased power level. In order to be able to know the schedule of the transmission with the increased power level, the announcement information means 9 has also to be connected to the power control means 16 to 18. For example, the announcement information means 9 could calculate the time point to transmit the announcement information on behalf of the last MAC frame transmitted with increased power so that, for example, the regular time interval for transmitting MAC frames with increased power has a length of 10 MAC frames, the announcement information means 9 could generate and implement the announcement information always 8 MAC frames after the last MAC frames transmitted with increased power.

Figure 9:
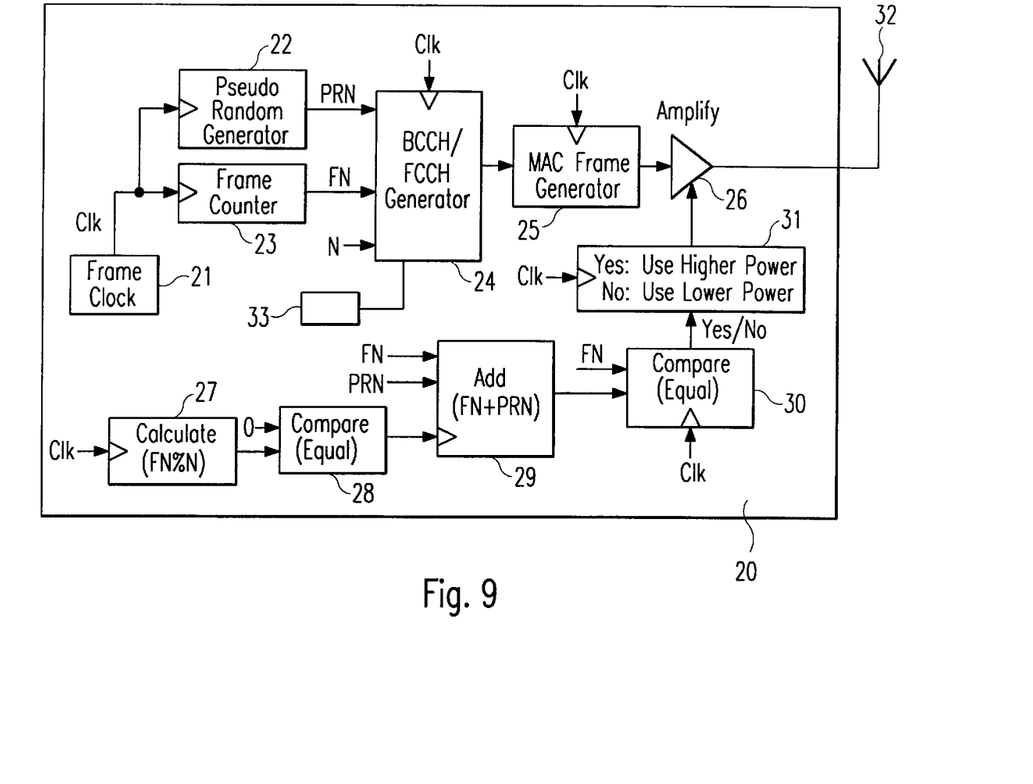
FIG. 9 shows a third embodiment of a base station according to the present invention.
Figure 10:
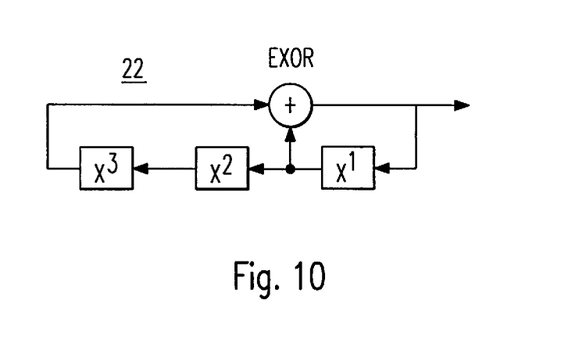
FIG. 10 shows an example for the implementation of a random number generator used in the third embodiment shown in FIG. 9.

In FIG. 9, a third embodiment of a base station 20 according to the present invention is shown. The base station 20 is adopted to transmit at least the BCCH and the FCCH of one or more MAC frames in irregular or randomly set time intervals. Thereby, the base station 20 comprises a power control means 27 to 31 to perform a scheduling calculation as described in relation to FIG. 5. The base station 20 comprises a frame clock means 21 for generating a frame clock, a frame counter 23 for generating consecutive numbers for the MAC frames and a pseudo random generator 22 for generating pseudo random numbers. The pseudo random generator 22 can for example be a linear feedback shift register as shown in FIG. 10.

Further, the base station 20 comprises a generating means 24 for generating the BCCH and the FCCH for the MAC frames to be transmitted. The BCCH and the FCCH generated in the generating means 24 are supplied to a MAC frame generating means 25, which incorporates the BCCH and FCCH from the generating means 24 into MAC frames to be amplified in an amplifier 26 to be transmitted via an antenna 32 to one or more mobile stations of the wireless radio communication system. The amplifier 26 is for example part of an HF upconverting means. The power control means of the base station 20 comprises a calculating means 27 for performing the calculation FN % N, whereby FN is the MAC frame number generated in the frame counter 23 and N is a basic repetition rate. The result of the calculation performed in the calculating means 27, which is the frame divider number FDN explained in relation to FIG. 5, is supplied to a compare means 28 and compared with the number zero. In case that the comparing result is positive, i.e. the number FDN equals zero, the comparing means 28 outputs a positive signal to an adding means 29, which then adds the current MAC frame number FN and the current pseudo random number from the pseudo random generator 22. The adding result is supplied to a comparing means 30, which compares the sum output from the adding means 29 to the current MAC frame number. In case that the current MAC frame number FN is equal to the sum output from the adding means 29, the comparing means 30 outputs a yes signal to a power setting means 31 which in this case indicates the amplifier 26 to use the higher power, i.e. to increase the transmission power for the current MAC frame (or at least the BCCH and the FCCH of this frame) to be transmitted. Otherwise, the comparing means 30 outputs a no signal to the power setting means 31 which indicates to the amplifier 26 to continue to use the normal (lower) transmission power for the current MAC frame. The calculation example shown and explained in FIG. 5 bases on a repetition rate N=16.

The repetition rate N can either be pre-set and fixed or may be varied according to the system requirements. A mobile terminal communicating with the base station 20 has to perform the same scheduling algorithm as the power control means 27 to 31 of the base station 20 in order to be able to adjust its receiving processing to the irregularly increased transmission power. Thereby, the repetition rate N can be pre-set and fixed in both the base station 20 and the corresponding mobile terminal or, in case that the repetition rate N is varied, the base station 20 has to transmit the repetition rate N to the corresponding mobile terminal so that the scheduling algorithm of the mobile terminal can be adopted to varying repetition rates N. The same is true for the pseudo random number used in the base station 20, which may be transmitted to the mobile terminals. Another possibility is to provide a pseudo random generator corresponding to the pseudo random generator 22 of the base station 20 also in the mobile terminals so that the same pseudo random chain of numbers can be generated. In this case, of course, a synchronisation between the mobile terminal and the base station has to be performed and the base station 20 has to inform the mobile terminals on a respective starting number of the pseudo random generator.

Another possibility is to provide an announcement information means 33 in the base station 20, which generates and provides announcement information within the BCCH or FCCH or any other essential communication control channel, e. g. a SBCCH (Slow BCCH) of the transmitted MAC frames announcing the occurrence of increased power levels to respective mobile terminals. This possibility is extensively explained in relation to FIG. 6. Further, the basic functions of the announcement information means 33 correspond to the functions of the announcement information means 9 of the base station 10. The announcement information is transmitted from the base station 20 shortly before at least the BCCH and FCCH of a MAC frame are transmitted with an increased transmission power so that the receiving mobile terminal can adjust its receiving processing correspondingly. The announcement information means 33 therefore has to know the time points of the transmission of MAC frames with increased power (or their power levels) and has therefore to be connected to the power control means 27 to 31 of the base station 20 (although this connection is not shown for clarity reasons). An example for a receiving mobile terminal communicating with the base station 20 is shown and explained in relation to FIG. 13.

As becomes clear from FIG. 5, the use of a basic repetition rate N (in this case N=16) being higher than the highest number generated by the pseudo random generator 22, i.e. the highest number of 7 in the present example, assures a certain minimum time interval between the transmission of increased power levels. This allows on the one hand to minimise the interference risk with other systems or cells and on the other hand enables mobile terminals newly trying to gain access to the base station not to have to wait too long until at least the BCCH and the FCCH with increased power is received.

FIG. 10 shows a block diagram of an example of a pseudo random generator 22 in form of a linear feedback shift register. The function of the shown shift register 22 can be describes by the polynom $S(x)=X^3+X+1$. With the shown shift register 22 in total $2^3-1=7$ pseudo random numbers can be generated. After initial loading of the tabs $X^3$, $X^2$ and $X^1$ of the shift register 22, a new number is generated after each clock cycle. The initial loading value must be 1, 2 . . . or 7 (not 0). The number generated is $X^1+2\times X^2+4\times X^3$ and therefore between 1 and 7. The forbidden state "0" can be used to signal for example the fallback to a transmission of MAC frames with the normal slow or semistatic power control mechanism without any significant increase of the transmitted power level in certain time intervals.

The shown shift register 22 generates the following sequence described as $X^3-X^2-X^1$: 001, 011, 111, 110, 101, 010, 100, 001, 011, 111, . . . expressed in numbers, whereby the number is calculated by $X^1+2\times X^2+4\times X^3$, the shift register 22 outputs the following chain of numbers: 1, 3, 7, 6, 5, 2, 4, 1, 3, 7, . . .

As explained above, the shift register 22 used as the pseudo random generator in the base station 20 generates a new pseudo random number PRN for each MAC frame. Then, for each MAC frame the calculation FN % N is performed. If the result of this calculation is 0, then the current pseudo random number is read and the MAC frame number of a frame to be transmitted with increased power is calculated as FN+PRN. Then, if the current MAC frame number is equal to the calculated number, the current MAC frame is transmitted with the increased power as described above. Thereby, the pseudo random number PRN generated by the pseudo random generator 22 for each MAC frame is transmitted in the BCCH or FCCH of the respective MAC frame to a receiving mobile terminal, in which a corresponding scheduling algorithm is implemented to enable an adjustment of the receiving processing to the increased power level. A corresponding mobile terminal is shown and explained in relation to FIG. 12. The advantage is that the base station and the corresponding mobile terminal can regenerate the schedule for the power increase MAC frames independently from each other, whereby the mobile terminal can generate the pattern any time based on any BCCH or FCCH received in an MAC frame respective if the MAC frame was transmitted with increased power or not.

It is to be noted that the base stations shown in FIGS. 7, 8 and 9 may be adapted to vary the increased power level value according to system requirements and transmit a corresponding information to the mobile terminals.

Figure 11:
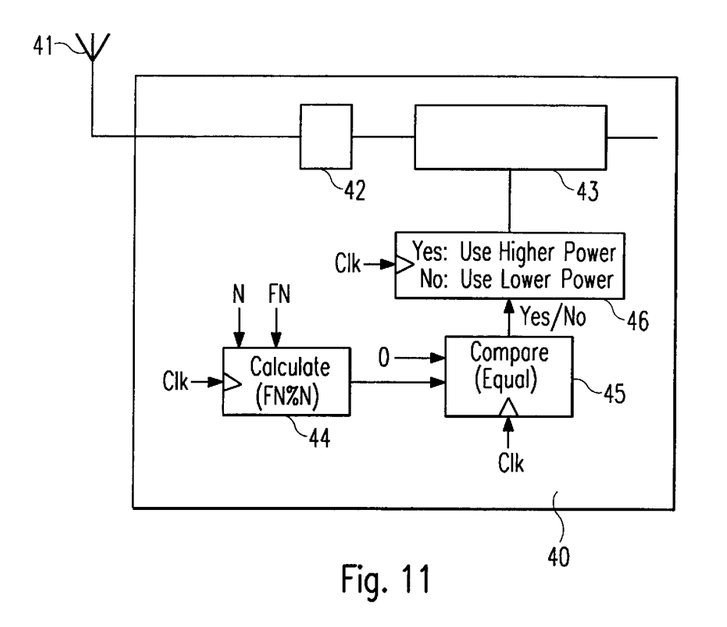
FIG. 11 shows a first embodiment of a mobile terminal according to the present invention.

FIG. 11 shows a first embodiment of a mobile terminal 40 according to the present invention. The mobile terminal 40 is adapted to communicate with the base station transmitting at least the BCCH and the FCCH of one or more MAC frames with increased power in regular time intervals, as for example the base station 1 shown in FIG. 7 or the base station 10 as shown in FIG. 8. The mobile terminal 40 comprises an antenna 41 and a HF down converting means 42 for receiving information on the basis of the wireless radio communication system from a mobile station. Further, the base station 40 comprises processing means 43 for processing the received information and may for example comprise demodulators, deinterleavers or the like. Further, the base station 40 comprises adjusting means 46 for adjusting the processing means 43 to the increased power of the received information. In order to achieve this, the adjusting means 46 is connected to setting means 44, 45 for setting the regular time intervals on the basis of a current MAC frame number FN and a repetition rate FN. The setting means comprises a calculating means 44 which performs a calculation FN % N. The result of this calculation is supplied to a comparing means 45, which compares the calculation result to the number 0. In case that FN % N equals 0, then the comparing means 45 outputs a yes signal to the adjusting means 46 indicating that the processing means 43 has to be adapted to an increased power level. Otherwise, the comparing means 45 outputs no signal to the adjusting means 46 indicating that no adjustment has to be performed in the processing means 43. In this case, only normally power controlled MAC frames have to be expected and processed in the processing means 43.

The repetition rate N can either be pre-set and stored in the calculating means 44 or can be received by the mobile terminal 40 from a respective base station, as for example the base station 8. The current MAC frame number FN is respectively contained in the BCCH or FCCH of the respective MAC frame transmitted from the respective base station. The current MAC frame number of a received MAC frame may for example be detected by a corresponding detecting means in the mobile terminal 40 and supplied to the calculating means 44. Further, the setting means 44, 45 and the adjusting means 46 of the mobile terminal 40 have to be synchronised to the corresponding base station in order to allow a proper adjustment of the scheduling mechanisms to each other.

Figure 12:
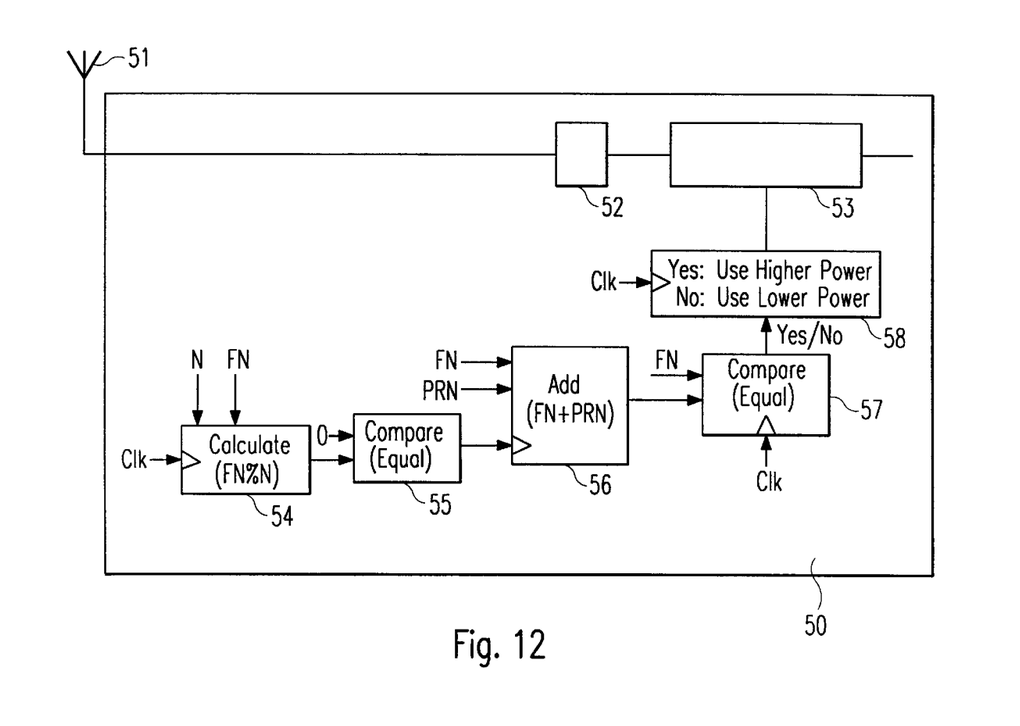
FIG. 12 shows a second embodiment of a mobile terminal according to the present invention.

FIG. 12 shows a second embodiment of a mobile terminal 50 according to the present invention. The mobile terminal 50 is adapted to receive at least a BCCH and a FCCH of one or more MAC frames from a respective base station with increased transmission power in irregular or pseudo random time intervals. A respective base station is for example shown and explained in relation to FIG. 9. The mobile terminal 50 comprises an antenna 51 and a HF demodulating means 52 for receiving MAC frame from a respective base station. Further, the mobile terminal 50 comprises processing means 53, as for example demodulators, interleavers or the like, for processing received information. In order to be able to adjust the receiving processing in the processing means 53 to the irregularly increased transmission levels, the mobile terminal 50 further comprises an adjusting means 58 for adjusting the processing means 53 to the increased transmission power. Since the transmission power is increased in random or irregular time intervals, the mobile terminal 50 further comprises setting means 54 to 57 for setting the random time intervals. Thus, the setting means 54 to 57 performs a scheduling operation corresponding to the scheduling operation performed in the corresponding base station, as for example the base station 22. Thereby, the setting means 54 to 57 uses a pseudo random PRN number generated and transmitted from the respective base station as well as the current MAC frame number FN transmitted in the BCCH or FCCH of the respective MAC frame. Further, the setting means 54 to 57 uses the same basic repetition rate N as the respective base station, whereby this repetition rate N can be fixed or pre-set and therefore stored in the respective mobile terminal 50, or can be transmitted and received by the respective base station which allows a more variable setting of this basic repetition rate N.

The setting means of the mobile terminal 50 comprises a calculating means 54 for performing a calculation FN % N. The calculation result is supplied to a comparing means 55 which compares the calculation result with the number 0. In case that the calculation result from the calculating means 54 is 0, the comparing means 55 outputs a yes signal to an adding means 56, which adds the current MAC frame number FN to the respective pseudo random number PRN for this current MAC frame number. The adding result is supplied to a comparing means 57, which compares the adding result to the current MAC frame number. In case that the adding result from the adding means 56 equals the current MAC frame number, the comparing means 57 outputs a yes signal to the adjusting means 58, which correspondingly adjusts the receiving processing performed in the processing means 53 to the increased power lever of the respective MAC frame. Otherwise, the comparing means 57 outputs a no signal indicating the adjusting means 58 not to perform an adjustment operation. Therefore, the setting means 54 to 57 of the mobile terminal 50 perform the same scheduling calculation as shown and explained in relation to FIG. 5, so that the mobile terminal 50 is able to adapt its receiving processing to the reception of increased power levels at irregular time intervals.

Figure 13:
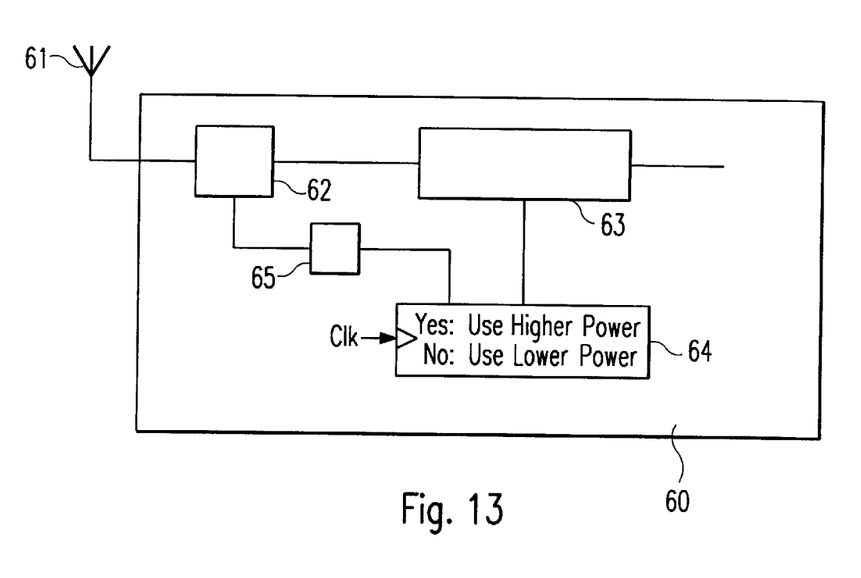
FIG. 13 shows a third embodiment of a mobile terminal according to the present invention.

In FIG. 13 a third embodiment of a mobile terminal 60 according to the present invention is shown. The mobile terminal 60 is adapted to receive announcement information before the transmission of at least a BCCH and a FCCH of one or more MAC frames with increased power before the actual increased power level transmission, as for example explained in relation to FIG. 6. The mobile terminal 60 comprises an antenna 61 and a HF down converting means 62 for receiving MAC frames from a corresponding base station. The received MAC frames are processed in a processing means 63, which comprises for example demodulators, deinterleavers and the like. Further, the mobile terminal 60 comprises detecting means 65 for detecting announcement information indicating the transmission time and/or the power level of at least a BCCH and a FCCH of one or more MAC frames with increased power. This announcement information is then supplied to an adjustment means 64 which in case of receiving a positive signal from the detecting means 65 correspondingly adjusts the receiving processing performed in the processing means 63 to the increased power level. Otherwise, the adjusting means 64 does not perform an adjustment operation to the processing performed in the processing means 63. The mobile terminal 60 is thus adapted to receive announcement information provided by the announcement information means 9 of the base station 10 shown in FIG. 8 and the announcement information means 33 of the base station 20 shown in FIG. 9. Compared to the embodiments shown in FIGS. 1 and 12, the mobile terminal 60 requires much less processing and thus power consumption. The detecting means 65 is adapted to receive the announcement information transmitted before the increased power level transmission, reads the correspondingly contained information such as the starting point, the power level and number of consecutive MAC frames transmitted with the increased power level and controls the adjusting means 64 correspondingly.

In case that a respective base station is adapted to vary the value of the increased transmission power, the mobile terminals shown in FIGS. 11, 12 and 13 comprise means for detecting a corresponding information transmitted from such a base station, whereby the adjusting means respectively uses the detected information to adjust the processing means correspondingly.

It is to be noted, that the base stations shown in and described in relation to FIGS. 7, 8 and 9 as well as the mobile terminals shown in and described in relation to FIGS. 11, 12, 13 only show the elements necessary and important for describing and understanding the present invention. However, all further necessary and known elements for operating the base stations and the mobile terminals respectively, in a wireless radio communication system have to be provided. In the present description, the description of these elements, however, is omitted for clarity reasons.

What is claimed is:

1. Base station for communicating with one or more mobile terminals of a wireless radio communication system, with transmitting means for transmitting information in medium access control frames of said communication system, power control means for controlling the transmission power of the transmitting means so that the transmission power of at least a broadcast control channel and a frame control channel in a respective medium access control frame is increased after certain time intervals to an increased transmission power level as compared to a normal transmission power level of other medium access control frames transmitted during said time intervals, and whereby the power control means controls the normal transmission power level of the other medium access control frames on the basis of measured transmission power levels of currently active mobile terminals so that the lowest possible transmission power is used which still enables a good connection to the currently active mobile terminal with the worst transmission conditions.

2. Base station according to claim 1,
characterized in,
that said increased transmission power level is an absolute transmission power level of the communication system.

3. Base station according to claim 1,
characterized in,
that said increased transmission power level is set relative to the power level of medium access control frames transmitted during said certain time intervals.

4. Base station according to claim 1,
characterized in,
that said certain time intervals are regular time intervals set by said power control means so that said transmission means transmits at least a broadcast control channel and a frame control channel of a respective medium access control frame regularly with said increased transmission power level after a fixed number of medium access control frames transmitted with a lower transmission power.

5. Base station for communicating with one or more mobile terminals of a wireless radio communication system, with transmitting means for transmitting information in medium access control frames of said communication system, power control means for controlling the transmission power of the transmitting means so that the transmission power of at least a broadcast control channel and a frame control channel in a respective medium access control frame is increased after certain time intervals to an increased transmission power level as compared to the transmission power level of other medium access control frames transmitted during said time intervals characterized in, that said certain time intervals are regular time intervals set by said power control means so that said transmission means transmits at least a broadcast control channel and a frame control channel of a respective medium access control frame regularly with said increased transmission power level after a fixed number of medium access control frames transmitted with a lower transmission power, and that said power control means sets said regular time intervals on the basis of a current medium access control frame number and a repetition rate.

6. Base station according to claim 5, characterized in, that said transmitting means transmits said repetition rate to said one or more mobile terminals of the communication system.

7. Base station according to claim 1, characterized by means for providing information on the transmission time and/or the power level of a respective medium access control frame in which at least a broadcast control channel and a frame control channel are transmitted with said increased transmission power level, whereby said transmitting means transmit said information to said one or more mobile terminals of the communication system respectively before the transmission of at least the broadcast control channel and the frame control channel with said increased transmission power level.

8. Base station according to claim 1, characterized in, that said certain time intervals are random time intervals set by said power control means so that said transmission means transmits at least a broadcast control channel and a frame control channel of a respective medium access control frame after a randomly set number of medium access control frames transmitted with a lower transmission power.

9. Base station according to claim 8, characterized by a random number generating means for generating a random number for each medium access control frame to be transmitted, whereby said power control means sets said random time intervals on the basis of said random numbers, a respective current medium access control frame number and a repetition rate.

10. Base station according to claim 9, characterized in, that said transmitting means transmits said repetition rate to said one or more mobile terminals of the communication system.

11. Base station according to claim 8, characterized by means for providing information on the transmission time and/or the power level of a respective medium access control frame in which at least a broadcast control channel and a frame control channel are transmitted with said increased transmission power level, whereby said transmitting means transmits said information to said one or more mobile terminals of the communication system respectively before the transmission of at least the broadcast control channel and the frame control channel with said increased transmission power level.

12. Mobile terminal for communicating with a base station of a wireless radio communication system, with receiving means for receiving information in medium access control frames of said communication system, processing means for processing received information, adjusting means for adjusting said processing means to the transmission power of the received information, whereby the transmission power of at least a broadcast control channel and a frame control channel in a respective medium access control frame is increased after certain time intervals to an increased transmission power level as compared to a normal transmission power level of other medium access control frames transmitted during said time intervals, whereby the normal transmission power level of the other medium access control frames is controlled on the basis of measured transmission power levels of currently active mobile terminals so that the lowest possible transmission power is used which still enables a good connection to the currently active mobile terminal with the worst transmission conditions, and whereby the adjusting means automatically adjusts said processing means to the normal transmission power.

13. Mobile terminal according to claim 12, characterized in, that said adjusting means is adapted to adjust said processing means to an increased transmission power level being an absolute transmission power level of the communication system.

14. Mobile terminal according to claim 12, characterized in, that said adjusting means is adapted to adjust said processing means to an increased transmission power level being increased by a relative value in respect to the power level of medium access control frames transmitted during said certain time intervals.

15. Mobile terminal according to claim 12, characterized in, that said certain time intervals are regular time intervals set so that said adjusting means regularly adjusts said processing means to the increased transmission power level of at least a broadcast control channel and a frame control channel of a respective medium access control frame after a fixed number of medium access control frames transmitted with a lower transmission power.

16. Mobile terminal for communicating with a base station of a wireless radio communication system, with receiving means for receiving information in medium access control frames of said communication system, processing means for processing received information, adjusting means for adjusting said processing means to the transmission power of the received information, whereby the transmission power of at least a broadcast control channel and a frame control channel in a respective medium access control frame is increased after certain time intervals to an increased transmission power level as compared to the transmission power level of other medium access control frames transmitted during said time intervals, wherein said certain time intervals are regular time intervals set so that said adjusting means regularly adjusts said processing means to the increased transmission power level of at least a broadcast control channel and a frame control channel of a respective medium access control frame after a fixed number of medium access control frames transmitted with a lower transmission power, and means for setting said regular time intervals on the basis of a current medium access control frame number and a repetition rate.

17. Mobile terminal according to claim 16, characterized in, that said repetition rate is received from a base station of the communication system.

18. Mobile terminal according to claim 12, characterized in, that said certain time intervals are random time intervals set so that said adjusting means adjusts said processing means to the increased transmission power level of at least a broadcast control channel and a frame control channel of a respective medium access control frame after a randomly set number of medium access control frames transmitted with a lower transmission power.

19. Mobile terminal for communicating with a base station of a wireless radio communication system, with receiving means for receiving information in medium access control frames of said communication system, processing means for processing received information, adjusting means for adjusting said processing means to the transmission power of the received information, whereby the transmission power of at least a broadcast control channel and a frame control channel in a respective medium access control frame is increased after certain time intervals to an increased transmission power level as compared to the transmission power level of other medium access control frames transmitted during said time intervals, wherein said certain time intervals are random time intervals set so that said adjusting means adjusts said processing means to the increased transmission power level of at least a broadcast control channel and a frame control channel of a respective medium access control frame after a randomly set number of medium access control frames transmitted with a lower transmission power, and setting means for setting said random time intervals on the basis of said random numbers, a respective current medium access control frame number and a repetition rate.

20. Mobile terminal according to claim 19, characterized in, that said repetition rate is received from a base station of the communication system.

21. Mobile terminal according to claim 12, characterized by, a detecting means for detecting information on the transmission time and/or the power level of a respective medium access control frame in which at least a broadcast control channel and a frame control channel are transmitted with said increased transmission power level respectively before the transmission with said increased transmission power level and for supplying said information to said adjusting means.

22. Communication method for the communication between a base station and one or more mobile terminals of a wireless radio communication system, whereby information is transmitted and received in medium access control frames of said communication system, and whereby the transmission power of at least a broadcast control channel and a frame control channel in a respective medium access control frame is increased after certain time intervals to an increased transmission power level as compared to a normal transmission power level of other medium access control frames transmitted during said time intervals, and whereby the normal transmission power level of the other medium access control frames is controlled on the basis of measured transmission power levels of currently active mobile terminals so that the lowest possible transmission power is used which still enables a good connection to the currently active mobile terminal with the worst transmission conditions.

23. Communication method according to claim 22, characterized in, that said increased transmission power level is an absolute transmission power level of the communication system.

24. Communication method according to claim 22, characterized in, that said increased transmission power level is increased by a relative value in respect to the power level of medium access control frames transmitted during said time intervals.

25. Communication method according to claim 22, characterized in, that said certain time intervals are regular time intervals whereby at least a broadcast control channel and a frame control channel of a respective medium access control frame are transmitted regularly with said increased transmission power level after a fixed number of medium access control frames have been transmitted with a lower transmission power.

26. Communication method for the communication between a base station and one or more mobile terminals of a wireless radio communication system, whereby information is transmitted and received in medium access control frames of said communication system, and whereby the transmission power of at least a broadcast control channel and a frame control channel in a respective medium access control frame is increased after certain time intervals to an increased transmission power level as compared to the transmission power level of other medium access control frames transmitted during said time intervals, wherein said certain time intervals are regular time intervals whereby at least a broadcast control channel and a frame control channel of a respective medium access control frame are transmitted regularly with said increased transmission power level after a fixed number of medium access control frames have been transmitted with a lower transmission power and wherein said regular time intervals are set on the basis of a current medium access control frame number and a repetition rate.

27. Communication method according to claim 22, characterized in, that said certain time intervals are random time intervals whereby at least a broadcast control channel and a frame control channel of a respective medium access control frame are transmitted after a randomly set number of medium access control channels has been transmitted with a lower transmission power.

28. Communication method according to claim 27, characterized by a random number is generated for each medium access control frame, whereby said random time intervals are set on the basis of said random numbers, a respective current medium access control frame and a repetition rate.

29. Communication method according to claim 21, characterized in, that information on the transmission time and/or the power level of a respective medium access control frame in which at least a broadcast control channel and a frame control channel are transmitted with said increased transmission power level is transmitted to said one or more mobile terminals of the communication system respectively before the transmission of at least the broadcast control channel and the frame control channel with said increased transmission power level.

* * * * *